United States Patent
Hain et al.

(10) Patent No.: US 11,226,027 B2
(45) Date of Patent: Jan. 18, 2022

(54) GEARING HAVING AN ELASTIC GEAR

(71) Applicant: SCHAEFFLER TECHNOLOGIES AG & CO. KG, Herzogenaurach (DE)

(72) Inventors: Bastian Hain, Creglingen (DE); Peter Zierer, Grostenseebach (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 240 days.

(21) Appl. No.: 15/758,587

(22) PCT Filed: Sep. 8, 2016

(86) PCT No.: PCT/DE2016/200425
§ 371 (c)(1),
(2) Date: Mar. 8, 2018

(87) PCT Pub. No.: WO2017/041802
PCT Pub. Date: Mar. 16, 2017

(65) Prior Publication Data
US 2018/0306299 A1    Oct. 25, 2018

(30) Foreign Application Priority Data
Sep. 10, 2015 (DE) .......................... 102015217300.3

(51) Int. Cl.
*F16H 49/00* (2006.01)
*F01L 1/352* (2006.01)

(52) U.S. Cl.
CPC .... *F16H 49/001* (2013.01); *F01L 2001/3521* (2013.01); *F16H 2049/003* (2013.01)

(58) Field of Classification Search
CPC ............. F16H 49/001; F16H 2049/003; F16H 2049/008
See application file for complete search history.

(56) References Cited

U.S. PATENT DOCUMENTS

| 4,619,156 | A | * | 10/1986 | Kiryu | F16H 49/001 74/640 |
| 4,625,582 | A | * | 12/1986 | Kiryu | F16H 49/001 74/640 |
| 5,775,178 | A | * | 7/1998 | Asawa | F16H 49/001 74/640 |

(Continued)

FOREIGN PATENT DOCUMENTS

| CN | 203560401 U | 4/2014 |
| CN | 104565281 A | 4/2015 |

(Continued)

OTHER PUBLICATIONS

International Search Report for Application No. PCT/DE2016/200425, dated Dec. 9, 2016, 7 pages.

*Primary Examiner* — Zakaria Elahmadi
(74) *Attorney, Agent, or Firm* — Rutan & Tucker LLP; Hani Z. Sayed

(57) ABSTRACT

A strain wave gearing, comprising an elastic gear retained by a housing component, wherein a connection between the elastic gear and the housing component has a first play in a circumferential direction and a second play in an axial and radial direction with respect to a center axis of rotation of the elastic gear, wherein the first play is an amount less than the second play.

14 Claims, 3 Drawing Sheets

(56) References Cited

U.S. PATENT DOCUMENTS

| | | | | |
|---|---|---|---|---|
| 5,850,765 | A | * | 12/1998 | Shirasawa ............ F16H 49/001 74/640 |
| 6,202,508 | B1 | | 3/2001 | Takizawa |
| 8,562,474 | B2 | * | 10/2013 | Yamamoto ................ F16H 1/32 475/170 |
| 8,651,992 | B2 | * | 2/2014 | Kataoka .................... F16H 1/32 475/162 |
| 8,840,513 | B2 | * | 9/2014 | Kusumoto ................ F16H 1/32 475/179 |
| 9,840,947 | B2 | * | 12/2017 | Kohrs ..................... F01L 1/352 |
| 2002/0174742 | A1 | * | 11/2002 | Kobayashi .............. F16C 33/60 74/640 |
| 2005/0217420 | A1 | * | 10/2005 | Kobayashi ............ F16C 33/581 74/640 |
| 2006/0272439 | A1 | * | 12/2006 | Wahler .................. F16H 49/001 74/457 |
| 2007/0039414 | A1 | * | 2/2007 | Takemura ............. F16H 49/001 74/640 |
| 2007/0157760 | A1 | * | 7/2007 | Kiyosawa ............... F16C 39/02 74/640 |
| 2007/0199405 | A1 | * | 8/2007 | Kobayashi ............ F16H 49/001 74/640 |
| 2007/0261516 | A1 | * | 11/2007 | Saito ..................... F16H 49/001 74/640 |
| 2011/0185846 | A1 | * | 8/2011 | Li ....................... F16D 23/0606 74/640 |
| 2014/0033840 | A1 | * | 2/2014 | Yokoyama ............... F16C 19/55 74/63 |
| 2014/0157925 | A1 | * | 6/2014 | Yajima .................. F16H 49/001 74/412 R |
| 2015/0033906 | A1 | * | 2/2015 | Kimus .................. F16H 49/001 74/568 R |
| 2015/0107388 | A1 | * | 4/2015 | Yajima .................. F16H 49/001 74/412 R |
| 2016/0109014 | A1 | * | 4/2016 | Murayama ........... F16H 49/001 74/640 |
| 2016/0201783 | A1 | * | 7/2016 | Miyake ................. F16H 49/001 74/640 |
| 2017/0009868 | A1 | * | 1/2017 | Kobayashi ............ F16H 49/001 |
| 2018/0252305 | A1 | * | 9/2018 | Hain ....................... F01L 1/352 |
| 2018/0372205 | A1 | * | 12/2018 | Preuss .................... F01L 1/352 |

FOREIGN PATENT DOCUMENTS

| | | |
|---|---|---|
| DE | 3815118 A1 | 11/1989 |
| DE | 4038555 A1 | 6/1992 |
| DE | 10258188 A1 | 6/2004 |
| DE | 102013207762 A1 | 10/2014 |
| DE | 102013220220 A1 | 4/2015 |
| DE | 102013220221 A1 | 4/2015 |
| EP | 00514829 A2 | 5/1991 |
| EP | 0741256 A1 | 11/1996 |
| JP | S59172950 A | 9/1984 |
| JP | H0267405 A | 3/1990 |
| JP | H057917 A | 1/1993 |
| JP | 2010127453 A | 6/2010 |
| WO | 2015021972 A1 | 2/2015 |

\* cited by examiner

GEARING HAVING AN ELASTIC GEAR

CROSS-REFERENCE TO RELATED APPLICATIONS

This application is the U.S. National Phase of PCT/DE2016/200425 filed Sep. 8, 2016, which claims priority to DE 102015217300.3 filed Sep. 10, 2015, the entire disclosures of which are incorporated by reference herein.

TECHNICAL FIELD

The disclosure relates to a gearing having an elastic gear, in particular a strain wave gearing for an electric camshaft adjuster or for a device for compression adjustment (VCR=variable compression ratio) of an internal combustion engine.

BACKGROUND

A gearing which has an elastic gear is known, for example from EP 0 741 256 B1. A further gearing with a flexible gear, in this case designated as a flexible cup element, is disclosed in EP 0514 829 B1. In both cases the flexible gear, which has the shape of a flange sleeve, has a thick hub region, which can be fastened on a housing component of the gearing. The flexibility of the gear is achieved through regions of thin cross-section within the gear. The known gearings are intended for use in small robots or precision machines. A class-specific gearing arises from U.S. Pat. No. 4,619,156. The elastic gear shown there has a toothed section and a section for connection to a housing component, wherein the two sections are connected by a circular spline. The circular spline absorbs the deformation load, however requires another material, thus complicating the production and is heavily loaded, particularly in the contact regions to the other two sections. The positive or non-positive connection limits the transferable torque and the service life.

SUMMARY

The disclosure addresses the problem of further developing a gearing with an elastic gear, in particular a strained wave gear over the mentioned prior art, wherein the gearing is intended to be used as a reduction gear unit in an electric camshaft adjuster of an internal combustion engine and in so doing should combine a compact structure with reliable function.

According to the disclosure, this problem is solved by a gearing as disclosed below. This gearing having at least one elastic gear comprises a housing component on which the elastic gear is retained, wherein the gear is connected on the housing component by using a connection arrangement which is rigid in circumferential direction, that is, at least approximately has little play, and at the same time, has a large amount of play in the axial direction and in the radial direction, in each case with respect to the center axis of the gear, compared to the connection the circumferential direction.

The elastic gear retained on the housing with direction-dependent play has in preferred embodiments a cylindrical, toothed section as well as a section adjoining said cylindrical, toothed section extending in the radial direction retained on the housing component. The toothing of the cylindrical section may be an external toothing which meshes with an internal toothing of the gearing fixed to the housing. The elastic gear formed of two sections, namely a cylindrical and a planar, annular section is also referred to as an angular ring, wherein the planar section directed outwards represents a flange of the elastic gear.

The section of the elastic gear extending in the radial direction, essentially lying on a single plane, can be retained with positive locking, in particular with the help of bolts, on the housing component, wherein each bolt is guided in an oblong hole of the named section of the gear. The thickness of the elastic gear can be either essentially the same or different in its two sections, wherein it is not necessary to introduce specific material weaknesses for the production of elasticity in the axial direction. The elastic gear can be part of a cup-type transmission.

The contours of the oblong holes, through which, in each case a bolt fixed to the housing is inserted, can lie completely within the section of the elastic gear extending in the radial direction. It is likewise possible that the oblong holes are formed by outwardly open slots of the flat section extending in the radial direction. In this case each oblong hole is limited on its narrow sides on the one hand, namely on the radial inner side, by the section extending in the radial direction itself, and on the other hand, namely radially outward, by an inelastic gear of the gearing. In particular, the latter gear can be a drive gear of the gearing that can be driven by using a traction means. This drive gear can be firmly connected to a housing component of the gearing or can be an integral component of the gearing housing.

Regardless of whether the contours of the oblong holes are formed completely or only partially by the section of the elastic gear extending in the radial direction, the outer edge of the section extending in the radial direction in advantageous configuration only partially describes a circular shape. In this connection, the outer edge has in accordance with one possible embodiment alternating concave and convex sections. Through the alternating concave and convex sections of the outer edge of the section of the elastic gear extending in the radial direction, said elastic gear extending in the radial direction has, viewed in the axial direction, a rounded star shape. Through the concave sections surface regions are released on the front side of the elastic gear, which for example can be used for the attachment of fastening elements.

The advantage of the disclosure lies in particular in the fact that through the decoupling of an elastic gear of a gearing vis-à-vis the gearing housing exclusively in the axial and radial direction a particularly high performance capability is achieved with respect to the transfer of rotating movements, wherein deformations of the gear in the radial direction are possible without hindrance. The gearing is suitable both for electric cam adjusters and for other adjustment devices, for example devices for the adjustment of the compression ratio in an internal combustion engine.

The gearing according to the application is particularly well suited for use in an electric camshaft adjuster with electrically driven actuating shaft. By way of example, reference is made in this context to the documents DE 10 2013 220 220 A1 and DE 10 2013 220 221 A1. In a further application the gearing is provided as part of an adjustment device for changing the compression ratio of an internal combustion engine.

BRIEF DESCRIPTION OF THE DRAWINGS

In the following several exemplary embodiments of the disclosure will be explained in greater detail in terms of a drawing. The figures show the following, partially diagrammed.

DETAILED DESCRIPTION

Figure 1:
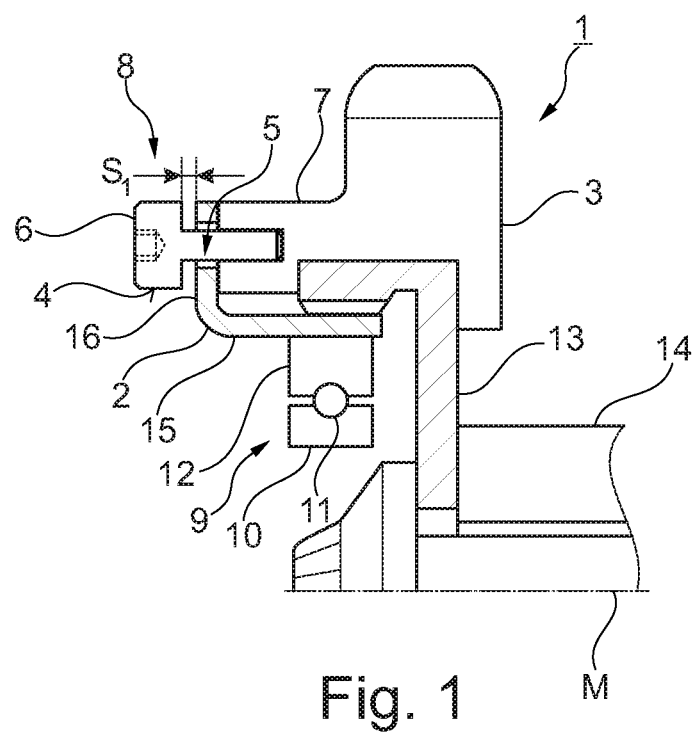
FIG. 1 shows in sections a first exemplary embodiment of a gearing with an elastic gear that can be used in an electric camshaft adjuster.
Figure 2:
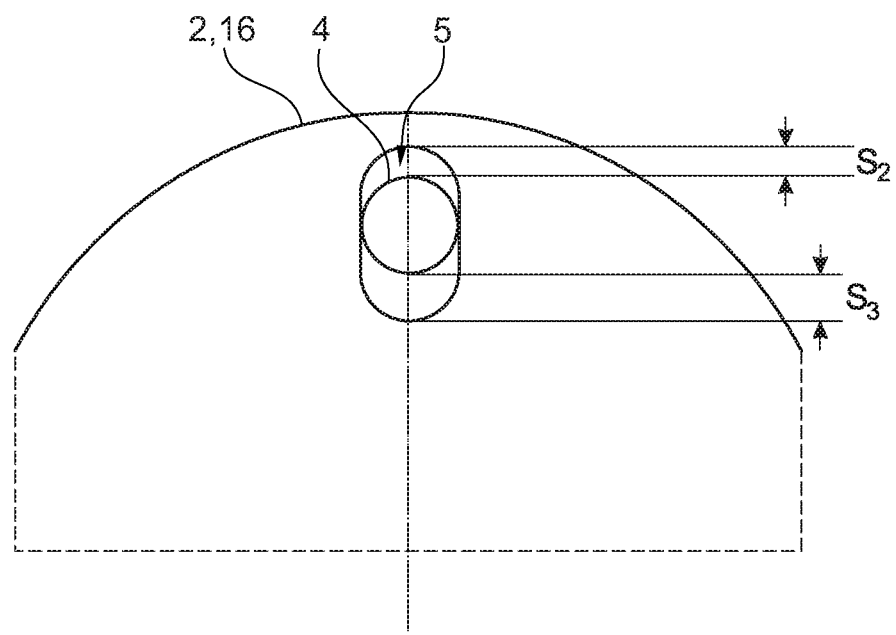
FIG. 2 shows a front detailed view of the elastic gear of the gearing according to FIG. 1.

FIGS. 1 through 4 show different exemplary embodiments of a gearing labeled as a whole with reference numeral 1, which is configured as a strain wave gearing and has an elastic gear 2. As a reduction gear unit, the gearing 1 is part of an electric camshaft adjuster of an internal combustion engine. With respect to the principal function of the gearing 1 reference is made to the cited prior art. The following statements, unless otherwise specified, relate to all of the exemplary embodiments.

The gearing 1 has a drive gear 3 which is driven via a traction means not shown in the figure, that is, a strap or a chain, by the crankshaft of the internal combustion engine, that is, a gasoline engine or a diesel engine. The rotating movement of the drive gear 3 is transferred to the elastic gear 2 practically free of play with the help of bolts 4 fastened in the drive gear 3, with respect to the circumferential direction. The gear 2 has to this purpose oblong recesses 5 which extend in the radial direction of the gear 2 and thus of the entire gearing 1. Heads 6 of the bolts 4 for one thing serve the purpose of screwing in the bolts 4 in a housing component 7 which can be configured in one piece with the drive gear 3, and for another thing are used for the captive retainment of the gear 2 on the housing component 7.

The connection arrangement labeled as a whole with reference numeral 8 between the gear 2 and the housing component 7 of the gearing 1 is configured such that only a play labeled with $S_1$ in the axial direction, related to the central axis of the gear labeled with M exists, as well as a play in the radial direction labeled with $S_2$ and $S_3$. In this way, deformations of the elastic gear 2 can be absorbed.

The deformations of the elastic gear 2 arise through a wave generator labeled 9 which has an outer ring labeled 12 as well as an elliptical inner ring 10. The outer ring 9 shown exaggeratedly thick in FIG. 1 fits the elliptical shape of the inner ring 10 in every operating state. The elastic gear 2 in turn directly surrounds the outer ring 12 fitting its noncircular shape. Between the bearing rings 10, 12, that is the inner ring 10 and the outer ring 12, of the wave generator 9 balls 11 roll as rolling elements. The outer ring 12 assuming an elliptical shape presses the elastic gear 2 on two diametrically opposed places against an inner toothed output gear 13. This output gear in turn is rotationally fixed to an output shaft 14, which can be identically or firmly connected to a camshaft of the internal combustion engine.

In all exemplary embodiments the elastic gear has a cylindrical, toothed section 15 as well as a section adjoining it, extending outward in the radial direction, wherein the recesses 5 are located in the section 16. In the case of FIG. 1 the inner ring 10 of the wave generator 9 is put into rotation by an electrically operated drive device not shown in the figure. The shaft driving the inner ring 10 is an actuating shaft; the gearing 1 overall is a three shaft gearing.

Figure 3:
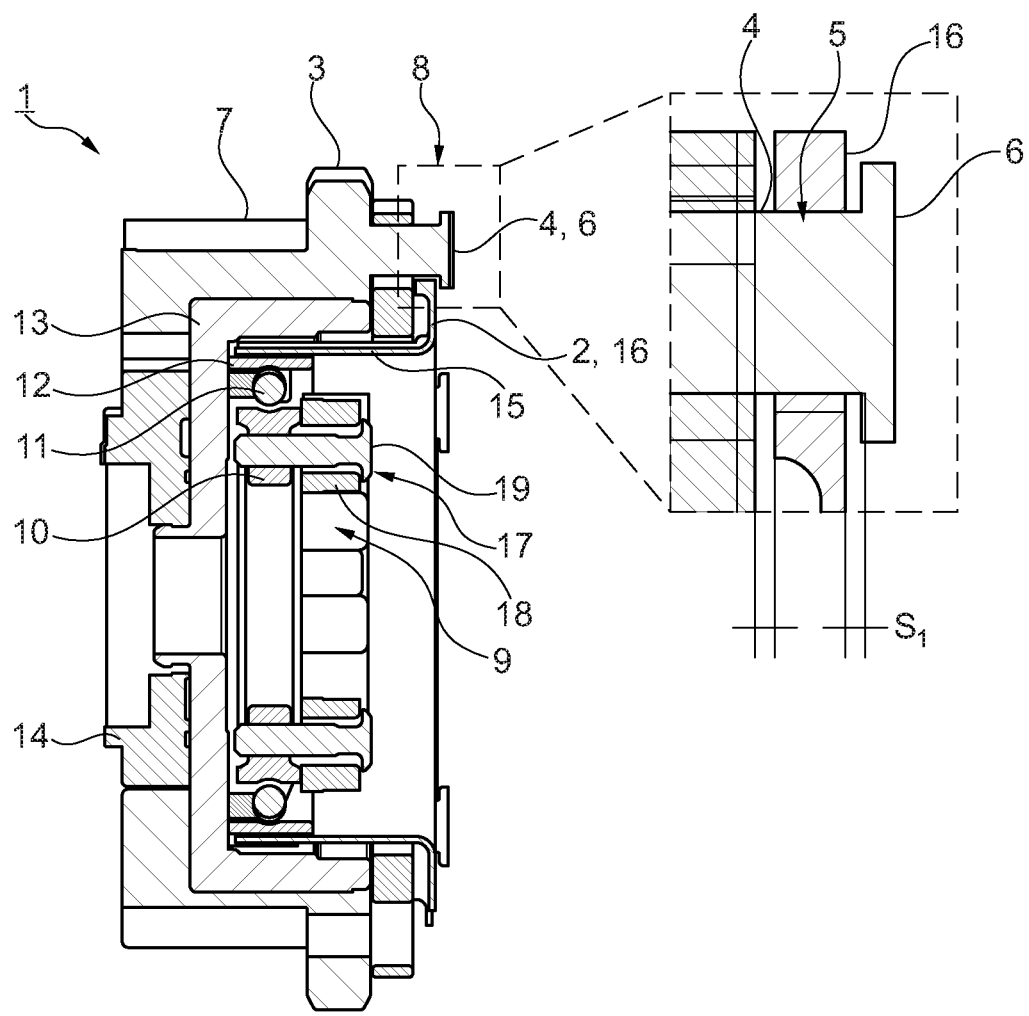
FIG. 3 shows in a sectional view as well as in an enlarged section a second exemplary embodiment of a gearing, namely strain wave gearing, with an elastic gear.

In the exemplary embodiment according to FIG. 3 the inner ring 10 can be driven via an Oldham coupling 17, that is, a self-aligning coupling, through an actuating motor not shown in the figure. The Oldham coupling 17 has an Oldham disk 18, wherein pins 19 are retained on the one hand in the inner ring 10 and on the other hand are displaceably guided in the Oldham disk 18. The axial play $S_1$, which enables a movement of the section 16 extending in the radial direction relative to the housing component 7 in the region of the bolts 4, is presented in detail in FIG. 3. Just as in the exemplary embodiment according to FIGS. 1 and 2, the contour of each of the recesses 5 configured as oblong holes is formed completely by the section 16 of the gear 2 extending in the radial direction.

Figure 4:
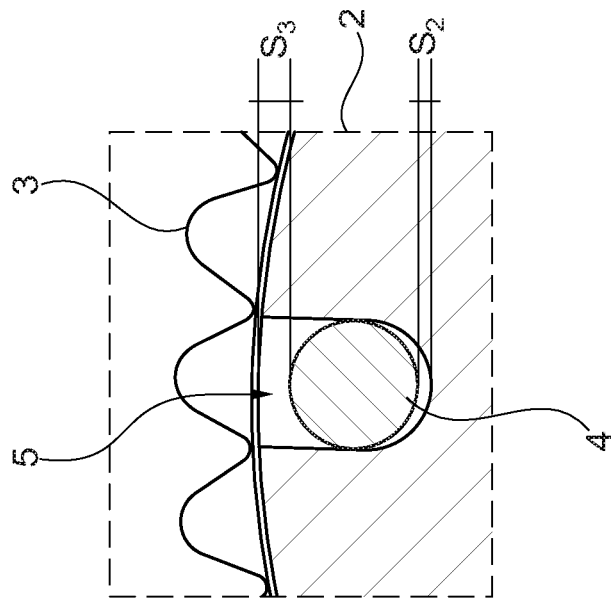
FIG. 4 shows in a front view as well as in an enlarged section a third exemplary embodiment of a gearing with an elastic gear.
Figure 4:
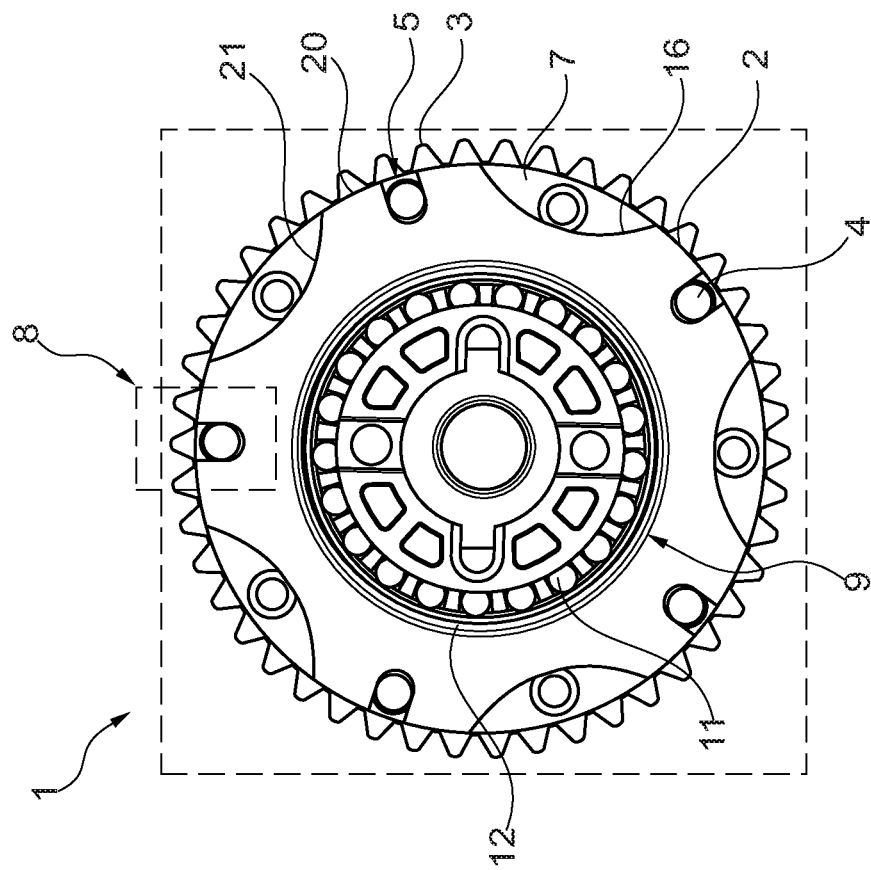

In contrast to this, in the exemplary embodiment according to FIG. 4 each of the oblong recesses 5 on the narrow side directed outward is not limited by the section 16 itself, but rather by a gear fixed to the housing, namely the drive gear 3. The inner contour of the drive gear 3 is in the view recognizable in FIG. 4 circular throughout. In contrast to this, the outer contour of the section 16 of the gear 2 extending in the radial direction is only partially circular. Hence, the section 16 extending in the radial direction is only partially in contact with the inner circumference of the drive gear 3. In this connection contact is given exclusively on convex sections 20 of the overall planar section 16. In the middle in each convex section 20 there is precisely one oblong recess 5, which in desired manner enables the coupling which is rigid in the circumferential direction, said coupling however having a great amount of play both in the axial direction and in the radial direction between the gear 2 and the housing component 7. Between the five convex sections 20 in the exemplary embodiment according to FIG. 4 there are likewise five concave sections 21, so that the outer contour of the frontally visible section 16 of the gear 2 describes overall a star shape.

In contrast to the Oldham coupling 17, the flexible connection of the gear 2 on the housing component 7 is not provided for the purpose of compensating a radial offset between the parts coupled to one another overall. On the contrary, the connection arrangement 8, which is realized with the assistance of the oblong recesses 5 as well as the bolts 4, is only provided for the purpose of absorbing deformations of the gear 2, without permitting considerable play between the gear 2 and the housing component 7 in the circumferential direction of the mentioned parts. Due to the flexible connection of the gear 2 on the housing component 7 the gear 2 does not need to have any essential elasticities that exceed the mass which is required for the function of the wave generator 9.

| Reference List | |
|---|---|
| 1 | Gearing |
| 2 | Gear |
| 3 | Drive gear |
| 4 | Bolt |
| 5 | Recess, oblong hole |
| 6 | Head of a bolt |
| 7 | Housing component |
| 8 | Connection arrangement |
| 9 | Wave generator |
| 10 | Inner ring |
| 11 | Ball |
| 12 | Outer ring |
| 13 | Drive gear |
| 14 | Drive shaft |
| 15 | Cylindrical, toothed section |

-continued

| Reference List | |
|---|---|
| 16 | Section extending outward in the radial direction |
| 17 | Oldham coupling |
| 18 | Oldham disk |
| 19 | Pin |
| 20 | Convex section |
| 21 | Concave section |
| M | Central axis |
| $S_1$ | Play in the axial direction |
| $S_2, S_3$ | Play in the radial direction |

The invention claimed is:

1. A gearing, comprising:
a housing component;
an elastic gear which has a cylindrical, toothed section and an adjoining section adjoining the cylindrical, toothed section that is extending in a radial direction; and
a connection arrangement that retains the adjoining section extending in the radial direction on the housing component such that the elastic gear includes an axial direction play and a radial direction play, in each case with respect to its central axis and is retained in a circumferential direction on the housing component, wherein the axial direction play enables movement of the toothed section extending in the radial direction relative to the housing component;
wherein the axial direction play is defined by an axial gap between (i) a head of a bolt retaining the adjoining section and passing through a recess of the adjoining section and (ii) a surface of the adjoining section facing the head of the bolt; and
wherein the radial direction play is defined by a radial gap between (i) the bolt and (ii) an oblong surface of the adjoining section defining the recess.

2. The gearing of claim 1, wherein the adjoining section points radially outward.

3. The gearing of claim 2, wherein the adjoining section is retained using the one or more bolts on the housing component.

4. The gearing of claim 3, wherein an outer edge of the adjoining section partially describes a circular shape.

5. The gearing of claim 4, wherein the outer edge has in each case an uneven number of concave and convex sections.

6. A gearing comprising:
a housing component;
at least one elastic gear that is retained by the housing component using a connection arrangement coupled in a circumferential direction, wherein the elastic gear includes a cylindrical, toothed section extending and an adjoining section extending outward in a radial direction;
wherein the housing component includes an axial direction play and a radial direction play with respect to a center axis of rotation of the elastic gear, wherein the axial direction play and radial direction play enable movement of the toothed section extending in the radial direction relative to the housing component;
wherein the axial direction play is defined by an axial gap between (i) a head of a bolt retaining the adjoining section and passing through a recess of the adjoining section and (ii) a surface of the adjoining section facing the head of the bolt; and
wherein the radial direction play is defined by a radial gap between (i) the bolt and (ii) a surface of the adjoining section defining the recess.

7. The gearing of claim 6, wherein toothing of the cylindrical, toothed section is an external toothing that meshes with an internal toothing of gearing fixed to the housing component.

8. The gearing of claim 6, wherein the adjoining section is configured to be retained with positive locking.

9. The gearing of claim 8, wherein the positive locking includes one or more bolts.

10. The gearing of claim 6, wherein the elastic gear includes a wave generator that includes an outer ring and an inner ring.

11. The gearing of claim 10, wherein the outer ring fits a shape of the inner ring.

12. The gearing of claim 10, wherein the elastic gear surrounds the outer ring fitting.

13. The gearing of claim 10, wherein one or more balls are located between the inner ring and outer ring.

14. The gearing of claim 6, wherein the cylindrical, toothed section and the adjoining section have an equal thickness.

* * * * *